Patented Aug. 13, 1940

2,210,894

UNITED STATES PATENT OFFICE 2,210,894

INSECTICIDAL EMULSION COMPOSITION

Edgar C. Britton, Midland, Mich., assignor to The Dow Chemical Company, Midland, Mich., a corporation of Michigan No Drawing. Application January 18, 1939, Serial No. 251,531

4 Claims. (Cl. 167—31)

This invention relates to insecticidal compositions and is especially concerned with petroleum oil emulsions containing an added insecticidal oil agent, at least partially dissolved in the oil, which increases the usefulness of such emulsions as horticultural spray preparations.

Among the objects of the invention is the preparation of petroleum oil emulsions having a materially greater toxicity for insect pests than common oil emulsion compositions heretofore known. Another object is to provide an oil-in-water emulsion comprising an added oil-soluble toxic ingredient which will be more economical in use than other known compositions. It is a further object to prepare such emulsions which are not injurious to growing plants and foliage and relatively non-toxic to animals and human beings at effective concentrations.

The oil emulsions now largely used for horticultural sprays contain highly refined petroleum fractions or distillates which are commonly called "white oils." Such oils are less injurious to foliage than less highly refined oils since they are highly inert chemically, but are less toxic to insects than the latter. At the concentrations necessary for effective insect control, "white oil" emulsions often produce physiological disturbances in healthy plants due to the formation of a persistent oil film on the surface of the foliage so as to interfere with normal transpiration and by the absorption of such persistent film into the circulatory system of the plant. More volatile oils at high dilutions have been found to evaporate so rapidly as to fail in accomplishing optimum insect control. When used in sufficiently high concentrations as to be more persistent on the sprayed surfaces, these oils frequently cause leaf and twig injury. In the case of dormant sprays, the high oil concentrations necessary for complete pest control frequently cause such bud and twig injury as seriously retards the development of the tree. Summer applications of common oil emulsions in effective concentration have been found to cause reduction in size, faulty coloring, and premature dropping of fruit, as well as serious defoliation of trees.

Oil emulsions have been produced with various toxic agents incorporated in the oil for the purpose of increasing insecticidal effectiveness. While in some instances an increased toxicity to insects has resulted, the dangers previously connected with the use of oil sprays have not been eliminated. Furthermore, such added toxicants have been so expensive as to materially increase the cost of pest control.

I have discovered that the addition of a small amount of either 2.4-dinitro-phenol or 2.4-dinitro-alpha-naphthol to an oil emulsion composition results in such an increase in toxicity that concentrations of the oil much lower than generally employed give highly effective control. At the low oil concentrations rendered practicable, the injurious effects of the oil on growing plants are materially reduced. These lower effective concentrations of the fortified oil compositions have made feasible the insecticidal application of emulsions of less highly refined and cheaper oils without introducing into their use increased hazards to the plant host. A further desirable element in the invention with respect to the use of 2.4-dinitro-phenol and 2.4-dinitro-alpha-naphthol is that these compounds are readily prepared or cheaply purchased so that their use does not materially increase the cost of insect control over the cost where a straight oil emulsion is employed.

It has heretofore been proposed to use 2.4-dinitro-phenol in other types of insecticidal compositions, but as far as now known, such compositions have never attained commercial importance. When used alone or in water suspension for insecticidal purposes, 2.4-dinitro-phenol at the effective concentration is not only harmful to foliage and to plants, but definitely toxic to humans.

When a very small amount of 2.4-dinitro-phenol or 2.4-dinitro-alpha-naphthol is dissolved in a suitable petroleum distillate, the toxicity of the oil for use in a spray emulsion is increased to such a degree as to render concentrations of the composition effective which otherwise would exert little or no insecticidal control. In practice, from about 0.05 to 10 per cent by weight of the toxicant is dissolved or dispersed in the oil and the latter then mixed with water in the presence of an emulsifying agent to form an aqueous emulsion of suitable strength for application to trees and plants. A further embodiment of the invention consists in adding 2.4-dinitro-phenol or 2.4-dinitro-alpha-naphthol, preferably in finely divided form, to a previously prepared straight oil emulsion whereby at least a portion of the toxicant passes into solution in the oily phase.

A suitable concentration of the oil-toxicant mixture or solution in the aqueous emulsion is between 0.1 and 5.0 per cent by weight, although somewhat higher concentrations may be employed with particular petroleum fractions. The amount of oil solution employed in the emulsion varies with the use for which the emulsion is intended, e. g. whether as a dormant or summer spray.

As has been pointed out above, the combination of the oil and nitro-phenolic toxicant greatly improves the action of oil emulsions. The combination of toxicants in emulsified form is more effective both in degree and range of killing power than either component thereof, and permits the use in emulsions of much lower concentrations of both oil and dinitro-phenol than are otherwise practical to give an equal degree of control. For example, while straight oil emulsions are relatively ineffective against aphids and chewing insects, the new compositions herein have a high killing power. Furthermore, while dinitro-phenol, dinitro-naphthol, or oil, at the concentrations required to effectively control mites, produce injurious effects on infested plants and their foliage, it is possible by the use of low concentrations of oil and phenolic toxicant to accomplish mite control without producing commercial injury of the plant host.

The approximate proportions of ingredients in per cent by weight which I prefer to use in making up commercial emulsions of suitable spraying strength are, in general:

| | |
|---|---|
| Petroleum distillate | 0.10 – 5.0 |
| 2.4-dinitro-phenol or 2.4-dinitro-alpha-naphthol | 0.001– 0.5 |
| Water and emulsifying agent | 99.899– 94.5 |
| | 100.000  100.0 |

The following examples set forth certain embodiments of my invention with respect to composition and application, but are not to be construed as limiting the same:

*Example 1*

The aphicidal values of oil solutions comprising 2.4-dinitro-phenol and 2.4-dinitro-alpha-naphthol were determined against adults of the species Aphis rumicis L. In each determination tests were made on groups of 25 or more aphids each. Solutions of 2.4-dinitro-phenol and 2.4-dinitro-alpha-naphthol in petroleum distillate, and controls of petroleum distillate alone, were emulsified with a solution of sodium caseinate in water before application to the aphids.

In each test the aphids were distributed over a disk of cotton flannel in a Petri dish and sprayed with 0.5 milliliter of the test emulsion. After spraying, the aphids were transferred from the flannel to a melon leaf, nasturtium foliage, or other growing vegetation, and allowed to stand for 24 hours. The percentage control was then calculated from averages of the dead and living aphids in the test groups.

0.1 gram of 2.4-dinitro-phenol was dissolved in 100 grams of a semi-refined petroleum oil having an unsulphonatable residue of 77 per cent, a Saybolt viscosity of 76 seconds, and a boiling range of 560°–760° F. This solution was emulsified with water and sodium caseinate to form a composition containing 0.5 per cent by weight of combined oil and toxicant. A similar composition was made up with 2.4-dinitro-alpha-naphthol. These emulsions were tested to determine their effectiveness as compared with that of a straight oil emulsion containing 0.5 per cent by weight of the distillate described above. The straight oil emulsion was found to be approximately 25 per cent less effective than the composition containing 2.4-dinitro-phenol and 73 per cent less effective than was the emulsion comprising the oil-dinitro-naphthol solution.

*Example 2*

The ovicidal values for emulsions of petroleum distillate and of petroleum distillate solutions of 2.4-dinitro-phenol and 2.4-dinitro-alpha-naphthol were determined against the eggs of Lygaeus Kalmii Stal. The phenolic toxicants were dissolved in the oil and emulsified with a solution of sodium caseinate and water. A control composition was prepared by omitting the phenolic constituent from the oil-caseinate-water emulsion. The petroleum distillate used in this determination was a semi-lubricating oil having a Saybolt viscosity of 99-100 seconds, a boiling range of 606°–742° F., and an unsulphonatable residue of 82 per cent.

The eggs for the test were selected from those oviposited over a 24-hour period and were thoroughly mixed to insure homogeneous sampling. Groups of 50 of these eggs were scattered evenly over the center of a piece of moistened filter paper enclosed in a Petri dish and sprayed with 2.5 milliliters of the test emulsions. The excess spray liquid was then drained off and the eggs stored at 30° C. and at a relative humidity of about 85 per cent over an incubation period of 6 days.

The eggs were then examined to determine the number of larvae hatched and developing in a normal manner, and the comparative controls calculated.

For example, 1.0 gram of 2.4-dinitro-phenol was dissolved in 100 grams of the previously described lubricating oil, and a portion of this solution emulsified with sodium caseinate and sufficient water to form a 2 per cent concentration of oil-toxic solution in the final mixture. This was tested as described above and compared with a control emulsion comprising 2 per cent by weight of the oil alone. A similar determination was made with 2.4-dinitro-alpha-naphthol. With the 2.4-dinitro-phenol 22 per cent and with the dinitro-naphthol 52 per cent fewer eggs hatched into normally developing larvae than hatched from those eggs treated with the straight oil emulsion at the same concentration.

*Example 3*

Tests were carried out with emulsions of 2.4-dinitro-phenol and 2.4-dinitro-alpha-naphthol solutions in petroleum distillate and of petroleum distillate alone to determine larvicidal efficiency. Small Jonathan apples of uniform size and of good grade were used to make the tests. Newly hatched codling moth larvae were obtained by the method of Farrar and Flint (Farrar and Flint, "Rearing Codling Moth Larva Throughout the Year"—J. Econ. Ent. 23:41–44, 1930). The 2.4-dinitro-phenol or 2.4-dinitro-naphthol was dissolved in the petroleum distillate and the resultant solutions emulsified with sodium caseinate in water. The apples were thoroughly washed and the stem and calyx cavities sealed with paraffin to prevent the entrance of larvae through these vulnerable zones. Each apple was sprayed by means of an atomizer with 10 cubic centimeters of the dilute test emulsion, after which it was stored under laboratory conditions for 24 hours before being infested with 10 newly hatched codling moth larvae.

Immediately upon transference of the larvae to the apples, the latter were incubated at 28.5° C. and 70 per cent relative humidity for 2 days, after which they were allowed to stand under prevailing laboratory conditions for an additional 5 days. The number of stings and entries in and on each apple was then recorded as an index of the effectiveness of the control treatment. An attack by the larvae upon the surface of the apple was considered a sting if the larvae had penetrated less than ¼ inch into the apple and was not found to be living. The injury was considered an entry if the live larvae was found or the hole was more than ¼ inch in depth.

The same petroleum oil was used in the preparation of the distillate-toxicant test solutions as described in Example 1. For example, 0.1 gram of 2.4-dinitro-phenol was dissolved in 100 grams of this oil and the resulting solution emulsified with sodium caseinate and sufficient water to give a 1.25 per cent dispersion of the oil-toxic in the final mixture. This emulsion was tested as described in the above paragraphs. The apples so treated were found to average a total of 1.8 entries and stings per apple after the prescribed period of incubation. A similar composition comprising 2.4-dinitro-alpha-naphthol allowed an average of only 1.4 stings and entries per apple. A spray emulsion comprising 1.25 per cent of the lubricating oil alone, when applied according to the described procedure, allowed an average of 2.9 entries and stings on each apple treated. It is evident, therefore, that the composition comprising the oil alone allowed 61 and 106 per cent more stings and entries than did the preferred insecticidal emulsions comprising 2.4-dinitro-phenol and 2.4-dinitro-alpha-naphthol, respectively.

While sodium caseinate has been specified as the emulsifying agent in each of the above examples, other emulsifying agents, such as casein, blood albumen, bentonite, naphthenates, glyceryl oleate, cresylic acid, oleic said, etc., may be substituted therefor depending upon the type of emulsion desired, e. g. stable, quick-breaking, tank mix, cold mix, miscible oil, etc. Similarly, other petroleum distillates may be substituted for those shown in the examples, provided only that such oily material contain at least 50 per cent by weight of unsulphonatable residue. The particular distillate selected is dependent upon the concentration of the dinitro-phenol to be dissolved therein and the particular purpose for which the finished emulsion is to be applied.

If desired, oils of vegetable or animal origin may be substituted in part for the petroleum distillate ordinarily employed. Among such materials which may be optionally included in the compositions falling within the scope of this invention are linseed oil, cottonseed oil, castor oil, fish oil, cod-liver oil, corn oil, olive oil, and the like. Similarly, other toxicants such as the pyrethrins, rotenone, and the like may be incorporated into the compositions to supplement the action of the nitro-phenolic compounds.

The foregoing examples show a substantial improvement in the characteristics of oil emulsions through the incorporation of small amounts of 2.4-dinitro-alpha-naphthol and 2.4-dinitro-phenol. In addition to the aphicidal, ovicidal, and larvicidal efficiencies indicated above, they are effective for the control of scale, mites, and related pests. The spray emulsions prepared according to the invention can be used in suitable killing strength without causing substantial injury to fruit, foliage, or tree, and in this respect are to be preferred over other oily insecticides heretofore commonly used. The emulsions in the concentrations disclosed are likewise relatively non-injurious to human beings and animals and leave substantially no spray residue to be removed from ripened fruit prior to marketing.

For commercial purposes, the herein-described new spray compositions may be made up in various ways. It is convenient to prepare concentrates for storage and shipping purposes which can later be diluted with water in the field to make spray dispersions of suitable strength. Such a concentrate may consist of an aqueous emulsion containing about 75 parts by weight of combined oil and phenolic toxicant and 25 parts of water, with a small amount of an emulsifying and/or spreading agent. For use in the field, such concentrate can be diluted with water in proportion of from about 0.5 to 10 parts of concentrate to 100 parts of water. In general, for dormant spray purposes, a suitable proportion of dinitro-phenol in the oil is from about 2 to 10 per cent by weight, while for a summer spray from about 0.05 to 1.0 per cent is satisfactory. Suitable proportions of the oil-toxicant mixture to be emulsified with water are from about 0.5 to 5 per cent by weight for dormant sprays and 0.1 to 0.75 per cent for summer sprays.

Other modes of applying the principle of my invention may be employed instead of those explained, change being made as regards the materials or their amounts employed, provided the ingredients stated by any of the following claims or their equivalent be employed.

I therefore particularly point out and distinctly claim as my invention:

1. An aqueous insecticidal emulsion suitable for application to living plants without causing injury thereto, comprising up to about 5 per cent of an oil having an unsulphonatable residue of at least 50 per cent by weight and up to about 0.5 per cent of a compound selected from the group consisting of 2.4-dinitro-phenol and 2.4-dinitro-alpha-naphthol.

2. An aqueous insecticidal emulsion suitable for application to living plants without causing injury thereto, comprising

| | Per cent by Weight |
|---|---|
| A petroleum distillate containing at least 50 per cent by weight of unsulphonatable residue | 0.1 – 5.0 |
| A member of the group consisting of 2.4-dinitro-phenol and 2.4-dinitro-alpha-naphthol | 0.001– 0.5 |
| Water and emulsifying agent | 99.899– 94.5 |
| | 100.000  100.0 |

3. An aqueous insecticidal emulsion suitable for application to living plants without causing injury thereto, comprising up to about 5 per cent of an oil having an unsulphonatable residue of at least 50 per cent by weight and up to about 0.5 per cent of 2.4-dinitro-phenol.

4. An aqueous insecticidal emulsion suitable for application to living plants without causing injury thereto, comprising up to about 5 per cent of an oil having an unsulphonatable residue of at least 50 per cent by weight and up to about 0.5 per cent of 2.4-dinitro-alpha-naphthol.

EDGAR C. BRITTON.